3,170,906
PRODUCTION OF CIS-1,4 POLYBUTADIENE WITH A CARRIER-SUPPORTED NICKEL OR COBALT OXIDE CATALYST
Kenichi Ueda, Akira Onishi, Toshio Yoshimoto, Junichi Hosono, and Katsuhiko Maeda, all of Yokohama, Japan, assignors to Bridgestone Tire Company Limited, Tokyo, Japan
No Drawing. Filed Dec. 28, 1960, Ser. No. 78,807
Claims priority, application Japan, Dec. 31, 1959, 32/41,519/59
6 Claims. (Cl. 260—94.3)

This invention relates to a process for the preparation of a solid butadiene polymer having a high content of cis-1,4 configuration by contacting butadiene with a catalyst system consisting of (A) a carrier-supported oxide of nickel or cobalt, (B) a boron halide, a complex compound thereof, chloride or oxychloride of a metal of group IV-A or V-A, and (C) an organometallic compound of a metal of group alkali-metal, II or III of the Periodic Table.

One object of our invention is to provide a novel and highly useful catalyst system for the preparation of a solid butadiene polymer having a high content of cis-1,4 configuration from butadiene. Another object is to provide a relatively low temperature, low pressure process for the polymerization of butadiene in substantial yields to form a solid butadiene polymer having a high content of cis-1,4 configuration.

In order to find the suitable catalyst for manufacturing cis-1,4 polybutadiene, the present knowledge of ordinary or even stereospecific catalyst for polymerization of monoolefin is almost useless, because monoolefin can not polymerize in the form of 1,4-addition. Even from the knowledge of the catalyst to polymerize isoprene in the form of cis-1,4-addition the catalyst to polymerize butadiene in the form of cis-1,4-addition is still unpredictable, perhaps because isoprene monomer is more stable in cis-form but butadiene is more stable in trans-form.

For instance, triethylaluminum-titanium trichloride catalyst is suitable for manufacturing isotactic poly propylene and triethylaluminum-titaniumtetrachloride catalyst is suitable for manufacturing cis-polyisoprene, but both catalysts are unsuitable for manufacturing cis-polybutadiene.

Prior to the present invention there were several known processes for polymerizing butadiene to a solid polymer having a high content of cis-1,4 configuration as follows:

(1) Phillips Process, which is a polymerization process using the catalyst system consisting of trialkyl-aluminum and titanium tetraiodide.

(2) Huls Process, which is a polymerization process using the catalyst system consisting of triisobutyl-aluminum and titanium tetrabromide.

(3) Montecatini Process, which is a polymerization process, using the catalyst system consisting of dialkyl-aluminum chlorides and cobaltous chloride or the like.

It has also been known in the polymerization of olefin that boron halides have effect of promoter for mixed catalyst of organo-aluminum compounds and a compound of a metal belonging to group IV, V or VI of the Periodic Table (refer to U.S. Patent No. 2,922,782).

This invention is based on the discovery of unexpected fact which could not be conceived from the above described methods, i.e. the inventors, after long continued investigations of catalysts which are effective to convert butadiene to a solid polymer having a high content of cis-1,4 configuration, have found that at first oxidized nickel-diatomaceous earth has such effect by itself and then that a catalyst consisting of oxidized nickel-diatomaceous earth and triethylaluminum or boron trifluoride etherate has also the similar effect and furthermore improved polymerization activity. The activity, however, is not still sufficiently large. On the other hand, the catalyst system prepared by mixing the three components of oxidized nickel-diatomaceous earth, boron trifluoride etherate and triethylaluminum as explained in the later examples showed to give remarkable increases not only in the polymerization activity but also in the molecular weight of the polymers obtained. This is an entirely unexpected fact.

Further, it has been proved that the present catalyst has advantages as explained hereafter if compared with those of known processes, that is, by the known process (1) using a mixed catalyst of triethylaluminum and titanium tetraiodide is provided the polymers having cis-1,4 contents of usually about 90%, and only about 94% at most, and by the known process (2) using a mixed catalyst of triisobutylaluminum and titanium tetrabromide is provided the polymer having a cis-content of about 85% at the maximum, and also in the process (3) using a mixed catalyst of cobaltous chloride and diethylaluminum chloride, with which the maximum content of cis-1,4 configuration in the polymer is obtainable, it is necessary to regulate the temperature of polymerization at a temperature below 25° C in order to obtain more than 90% of cis-1,4 configuration because as the polymerization temperature becomes higher the content of cis-1,4 configuration decreases and if the polymerization is effected at 40° C. the cis-1,4 content will be reduced to 83.5% as described. On the contrary, when the catalyst system of this invention is used it is not necessary to keep the temperature of polymerization at room temperature or less in order to obtain more than 90% of cis-1,4 configuration and even when the polymerization is effected at a temperature of 40° C. or higher, more than 95% of cis-1,4 configuration of obtained polymer can be maintained. This means that the control of exothermic polymerization reaction of butadiene is very easy and it is one of the advantageous features of the catalyst system of this invention.

The known process using boron halides as a promoter uses as a component of the catalyst a compound of any of metals of groups IV, V and VI of the Periodic Table, while this invention does not use such a compound as a catalyst component, but uses a carrier-supported oxide of nickel or cobalt, so that it is different from the catalyst of the above known process. Moreover, the essential difference is that boron halides are used for changing the activity of olefin polymerization and lowering the molecular weight of the obtained polymer in the known process, while the boron halides are used for increasing the molecular weight up to the extent which could not be obtained with a catalyst of oxidized nickel-diatomaceous earth alone or a mixture of it and an organoaluminum compound in the process of this invention. This fact proves that the present invention can never be conceived from the known process.

The present invention provides a novel process of polymerization well adapted for converting butadiene to a solid polymer having a high content of cis-1,4 configuration in the presence of the catalyst system which is essentially different from those of known processes for polymerization as above described. The butadiene polymers manufactured by the process of this invention are rubbery solids and if their microstructures are determined according to the infrared spectroscopic analysis proposed by Morero (La Chimica e l'Industria, 41, 758 (1959)), the cis-contents of them are usually more than 85%, while 95% or more in the case of using some representative catalyst component combinations. The polybutadiene manufactured with some representative catalyst systems of this invention contains usually no gel even when butadiene is polymerized under the conditions of a temperature between 0° C. to 70° C. and a high concentration of produced polymers.

The present invention also provides a method for preparing a novel catalyst system by mixing at a controlled temperature three kinds of indispensable components A, B and C described as follows:

The A component is a carrier-supported oxide of a metal selected from the class consisting of nickel and cobalt which is prepared by dispersing said metal oxide on a carrier to give a large surface area for the weight and is used in the form of fine powders or a porous solid. Preferably carrier-supported oxide of nickel is used in this invention because it is better in polymerization activity and cis-1,4 orientating power as shown in later examples.

The B component is a metal halide selected from the class consisting of boron halides, complex compounds thereof, the halides of the metals of groups IV-A and V-A, the oxyhalides of the metals of group V-A and the derivatives obtatined by substituting a monovalent hydrocarbon radical for a part of halogen atoms of the metals of groups IV-A and V-A of the Periodic Table.

The C component is selected from the class consisting of the organometallic compounds of the metals of groups alkali-metal, II and III of the Periodic Table.

The mixing ratios of three components A, B and C affect the polymerization activity of the catalyst system, among which the mole ratio of said C to said B component has a greater influence on the activity. Said mole ratio used in the process of this invention lies between about 0.1 and about 10 and preferably between about 0.1 and about 5. The mole ratio lying within from 0.5 to 1.2 results in the largest polymerization activity in general. The ratio of said A to said B or C component is not so critical as the ratio of C to B component, but the mole ratio of said metal oxide to said C component is between about 0.1 and about 10 as hereinafter described.

The present invention provides a process for polymerizing butadiene to a solid polymer having a high content of cis-1,4 configuration by using said catalyst system in liquid phase at a temperature of from −50° C. to 150° C. and under the pressure under which the liquid phase can be maintained and under an inert atmosphere. It is preferable to effect the polymerization by using the catalyst system at a temperature within the range of −5° C. to 70° C. and at one atmospheric pressure or several atmospheres. The polymerization proceeds under the partial pressure of butadiene lower than 1 atmosphere.

The A component of the catalyst of this invention which is a carrier-supported nickel oxide or cobalt oxide having a large surface area for the weight may be prepared by following methods.

One method is oxidation of any of hydroxide, organic acid salts and inorganic acid salts of nickel or cobalt adhered to a carrier having a large surface area for its weight by the impregnation or the co-precipitation described in literatures, thereby said oxidation being effected with oxygen or a mixture of oxygen and nitrogen at a temperature lower than 600° C. The examples of said organic acid are formic acid, oxalic acid, acetic acid, citric acid and tartaric acid. The examples of said inorganic acid are nitric acid, sulfuric acid and carbonic acid.

Another method is an oxidation of any of carrier-supported reduced nickel and cobalt which is used for ordinary hydrogenation reaction, thereby said oxidation being effected with a mixture of oxygen and nitrogen at a temperature lower than 600° C. to avoid sintering.

The carrier which is an indispensable constituent of the A component of the present catalyst system has the power to promote the effectiveness of said metal oxide. According to the comparative experiment the catalyst system comprising non-supported metal oxide was far less effective for butadiene polymerizaiton as shown in later example. Thus this power of the carrier makes it possible to produce successfully the catalyst system of this invention. An effective carrier of this invention has surface areas of at least 1 square meter per gram.

Said carrier-supported metal oxide usually contains said metal oxide in a proportion between about 0.5 and about 90 weight percent. The examples of said carrier are diatomaceous earth, silica, silica-alumina, titania, zirconia, active clay and kaolin. Among these diatomaceous earth is preferably used.

The examples of said B component of the catalyst system of this invention are boron trifluoride, boron trifluoride etherates, boron trichloride, boron tribromide, titanium tetrachloride, titanium tetrabromide, titanium trichloride, zirconium tetrachloride, vanadium tetrachloride, vanadium oxychloride, alkyltitanium trichlorides and dicyclopentadienyl titanium dichloride.

The examples of said C component of the catalyst system of this invention are:

Trialkylaluminum, dialkylaluminum halides, alkylaluminum dihalides, trialkylboron, dialkylmagnesium, dialkylzinc, dialkylcadmium, alkylmagnesium halides, arylmagnesium halides, alkyllithium, alkylsodium, alkylpotassium, lithium aluminum tetraalkyl, in which an alkyl group contains less than eleven carbon atoms.

The three component catalyst system of this invention is prepared by mixing together said A, B and C components in liquid phase at a controlled temperature between about −100° C. and about +150° C. depending on selected component combination. Above said liquid phase is preferably selected from inert anhydrous liquid hydrocarbons.

When the B component is boron trifluoride or boron trifluoride etherate, it is preferable that said B component is mixed with said carrier-supported metal oxide suspended in an anhydrous liquid hydrocarbon diluent and then the mixture is heat-treated at a temperature between about 10° C. and about 100° C. Then the heat-treated mixture is mixed with said C component after it is cooled to a temperature between about 30° C. and about −80° C.

On the other hand, when the B component is titanium tetrachloride and the C component is trialkylaluminum, both being soluble in hydrocarbon, it is preferable that the three components A, B and C are mixed together in the described order at a temperature between about −100° C. and about 40° C. in liquid hydrocarbon solvent.

In general it is necessary to mix the three components uniformly as possible by the operation of dissolving, dispersing, stirring or shaking to react effectively.

As above described, the activity of the catalyst system of this invention to polymerize butadiene depends on the order of mixing of catalyst components, their reaction temperature and their reaction time. These facts reveal that the catalyst system of this invention is not a simple mixture of three components, but a reaction product consisting of three components which are combined indispensably.

Various modifications concerning the method of catalyst preparation may be utilized for control of polymerization reaction.

Preferably the following combinations of catalyst components are used in this invention as shown in later examples:

Oxidized nickel - diatomaceous earth - boron trifluoride etherate - triethylaluminum, oxidized nickel - diatomaceous earth-boron trifluoride etherate-butyllithium, oxidized nickel-diatomaceous earth-titanium tetrachloride-triethylaluminum, oxidized nickel-diatomaceous earth-titanium tetrachloride-butyllithium and oxidized nickel-diatomaceous earth-titanium tetrabromide-triethylaluminum.

It is desirable to minimize the introduction of water, oxygen, alcohol and acid into contact with the catalyst, but the effect of these materials on the polymerization activity and cis-1,4-orientating activity of the catalyst system is not so sensitive as that of Ziegler-type catalyst.

Solvent is generally used to control the polymerization easily, but of course the polymerization can be effected without solvent, thereby the volume ratio of solvent to monomer being not so critical, but usually less than 40.

Solvents used in this invention are hydrocarbon or halogen substitutes thereof belonging to substantially dehydrated aromatic, alicyclic or aliphatic group, as for instance, benzene, toluene, a xylene, cyclohexane, heptane, pentane, petroleum ether, carbon tetrachloride, chlorobenzene or a mixture having such components. Among these, benzene, toluene, or a xylene is preferable. Instead of using solvents non-reacted butadiene may be used as a diluent.

The catalyst system of this invention has powerful polymerization activity and only 0.1 mole of the C component in the catalyst system per 1000 moles of butadiene monomer is sufficient to effect polymerization in the representative combinations of the catalyst components. Thus the catalytic conversion of butadiene can be effected by various known types of polymerization process, wherein suspension catalyst or stationary bed or moving bed catalyst is used.

The reaction product of polymerization is usually perfectly dissolved in the solvent and solids in the catalyst precipitates gradually. In this case, the separation of polymer solution not containing solids can be easily done by means of a siphon or filtration. When, however, the viscosity of the solution is too high, more solvent should be added to the solution to lower the viscsity of the solution to a suitable value and solids should be completely separated by means of a siphon, filter or a centrifuge. The polymer solution perfectly deprived of solids is concentrated by vacuum evaporation at room temperature and after the solution has been sufficiently concentrated it is poured into large amount of lower alcohol to decompose and eliminate the soluble part of the catalyst and at the same time to precipitate the polymer.

In this case an antioxidant is mixed uniformly in the polymer, then the polymer is dried in vacuo at room temperature.

Butadiene polymers manufactured by the method of this invention are rubbery solids. When the intrinsic viscosity of these polymers is measured as a toluene solution at 25° C., they are usually in a range of 1.0 to 5.0. The gel content of these polymers are usually small when measured by filtering their toluene solution with 200 meshes wire gauze, while it is substantially zero in the polymer obtained by a catalyst system containing a boron trifluoride ether complex as a B component.

The function of the components B and C of this invention is essentially different from the function of the mixture of the B and C components alone on the polymerization of butadiene. The polymerization of butadiene by the mixture of the B and C components had already been investigated over a wide range (refer to, for instance, N. G. Gaylord, H. F. Mark, Linear and Stereoregular Addition Polymers, Interscience Publishers (1959)). For instance, with titanium tetrachloride-triethylaluminum, if Ti/Al is 0.5:1 to 1.5:1 mole ratio, a mixture of cis-1,4 polybutadiene and trans-1,4 polybutadiene (the content of cis-1,4 configuration for the total polybutadiene is less than 70%) is obtained and if the ratio is 1.5:1 to 3:1, more particularly 2:1, substantially all trans-1,4 polybutadiene is obtained. With a mixed catalyst of titanium trichloride, vanadium trichloride or vanadium oxychloride and organometallic compounds of aluminum or zinc, trans-1,4-rich polybutadiene is obtained. In general, with the mixed catalyst of the chlorides of metals in IV–A group and V–A group in the Periodic Table and organometallic compounds, trans-1,4-rich polybutadiene is obtained more often, as is well known.

The polymerization of the method of this invention is based on the discovery that the carrier-supported oxide of group VIII metal has strong cis-1,4 orientation, independent of orientating properties of B-C mixture. Even if, for instance, B-C combination which has strong ability of trans-1,4 orientation is employed as the two components in the method of this invention it only serves mainly as the promoter. However, the catalyst of this invention using oxidized nickel-diatomaceous earth, titanium tetrachloride and triethylaluminum as A, B and C respectively (mole ratio of B/C is 1) provides polybutadiene having more than 90% cis-1,4 content.

*Example 1*

Similarly to the method of manufacturing reduced nickel-diatomaceous earth catalysts to be used for ordinary hydrogenation reaction, basic nickel carbonate is precipitated on diatomaceous earth by mixing nickel sulfate and sodium carbonate in a dispersion of diatomaceous earth in water, and after dried, the carbonate on the carrier was thermally decomposed at 350° C. by passing air and then reduced at 360° C. by passing hydrogen. The reduced nickel-diatomaceous earth (nickel content: 50%) thus obtained was brought into contact with gas which consists of air diluted with a large quantity of nitrogen to be stabilized and then oxidized at 480° C. for 5 hours by passing air. The oxidized nickel-diatomaceous earth thus obtained was black powders.

A given quantity of the oxidized nickel-diatomaceous earth, 40 ml. of purified benzene dehydrated by metallic sodium, a given quantity of titanium tetrachloride and a given quantity of triethylaluminum were successively introduced in a pressure bottle of 180 ml., while flushing purified nitrogen gas therein and shaking the bottle. After the pressure bottle was cooled to −20° C. and 25 ml. of liquefied butadiene dried with caustic potash and calcium chloride, then dehydrated by cooling to −78° C. were poured in the bottle. The bottle was tightly sealed and revolved for agitation in a thermostat at 40° C. for a certain time at a speed of 40 r.p.m., then the bottle was opened and unreacted butadiene was expelled. 100 ml. of benzene were added to the residual solution and after well-shaked the mixture was allowed to stand for a short time to precipitate the solid parts of the catalyst system. Then the supernatant liquid was taken out and a small amount of suspended solids of catalyst was perfectly eliminated from it by centrifuge and then it was poured in a large amount of methanol containing an antioxidant to precipitate the polymer and at the same time to decompose soluble portions of the catalyst. The polymer was dried in vacuo at room temperature which was a white rubbery solid. Its microstructure was determined according to Morero method and its intrinsic viscosity was measured at 25° C. as a toluene solution.

For the sake of comparison, the polymerization reactions using oxidized nickel-diatomaceous earth alone, and oxidized nickel-diatomaceous earth-triethylaluminum were effected. Also the polymerization reactions using the catalyst system comprising non-supported nickel oxide are effected in the same manner with Nos. 1 and 2 (commercial nickelous oxide or nickelic oxide).

| No. | Oxidized nickel-diatomaceous earth (g.) | Titanium-tetrachloride (mmoles) | Triethyl-aluminum (mmoles) | Polymerization time (hr.) | Polymer yield (g.) | Microstructure (percent) | | | Intrinsic viscosity |
|---|---|---|---|---|---|---|---|---|---|
| | | | | | | cis-1,4 | trans-1,4 | Vinyl | |
| 1 | 1.0 | 1.0 | 1.0 | 1.5 | 7.8 | 92.6 | 3.9 | 3.5 | 1.0 |
| 2 | 2.0 | 1.0 | 1.0 | 1.5 | 5.3 | 94.6 | 2.6 | 2.8 | 1.7 |
| Reference: | | | | | | | | | |
| 1 | 5.0 | | 1.0 | 3.5 | 2.6 | 94.4 | 3.0 | 2.6 | |
| 2 | 10.0 | | | 4.0 | 2.4 | 94.2 | 3.4 | 2.4 | 1.4 |
| 3 | NiO, 2.0 | 1.0 | 1.0 | 5.0 | Less than 0.1 | | | | |
| 4 | Ni$_2$O$_3$, 2.0 | 1.0 | 1.0 | 5.0 | Less than 0.1 | | | | |

*Example 2*

Nickel carbonate was precipitated on diatomaceous earth by mixing nickel nitrate and sodium bicarbonate in a dispersion of diatomaceous earth in water and the carrier-supported nickel carbonate was thermally decomposed by oxidation at 450° C. for 10 hours by passing air. The oxidized nickel-diatomaceous earth thus obtained comprised 10% of nickel, and showed dark brown color. Butadiene was polymerized in the similar manner as in Example 1 except by using the catalyst system prepared by mixing oxidized nickel suspended in 40 ml. of benzene, titanium tetrachloride and triethylaluminum in the described order at −50° C.

*Example 5*

Cobalt carbonate was precipitated on diatomaceous earth by mixing cobalt nitrate and sodium bicarbonate in a dispersion of diatomaceous earth in water and the carrier-supported cobalt carbonate thus obtained was thermally decomposed by oxidation at 480° C. for 5 hours by passing air. The oxidized cobalt-diatomaceous earth thus obtained was black powders containing 50% of cobalt. Butadiene was polymerized in the same manner as Example 2 by using oxidized cobalt-diatomaceous earth instead of oxidized nickel-diatomaceous earth. The polymer thus obtained was a transparent rubbery solid.

| No. | Oxidized cobalt-diatomaceous earth (g.) | Titanium tetrachloride (mmoles) | Triethyl-aluminum (mmoles) | Polymerization time (hr.) | Polymer yield (g.) | Microstructure (percent) | | |
|---|---|---|---|---|---|---|---|---|
| | | | | | | cis-1,4 | trans-1,4 | vinyl |
| 1 | 2.0 | 1.0 | 1.0 | 3.0 | 2.3 | 93.1 | 6.1 | 0.8 |
| 2 | 2.0 | 1.5 | 1.0 | 3.0 | 3.0 | 87.6 | 8.8 | 3.6 |
| 3 | 2.0 | 2.0 | 4.0 | 0.2 | 3.0 | 93.6 | 4.9 | 1.5 |

*Example 6*

Diatomaceous earth was dispersed in an aqueous solution of nickel nitrate and 10% solution of sodium carbonate was gradually fed drop-by-drop therein. Basic nickel carbonate was precipitated on the diatomaceous earth, and the precipitate was washed with water, dried, and oxidized at 450° C. for 5 hours by passing dry air. The oxidized nickel-diatomaceous earth thus obtained was grayish black powders containing about 10% nickel.

60 ml. of purified benzene was put in a pressure bottle while flushing purified nitrogen and 1 g. of said oxidized nickel-diatomaceous earth was dispersed therein, and then 2.0 mmoles of boron trifluoride etherate was added thereto and the mixture was heated at 40° C. for 1 hour with stirring and after cooled to room temperature, 2.0 mmoles of triethylaluminum was added to prepare the catalyst system. The bottle was cooled to −10° C. and 25 ml. of liquefied butadiene was poured in it. Then the bottle was tightly sealed and subjected to the revolution of 40

| No. | Oxidized nickel-diatomaceous earth (g.) | Titanium tetrachloride (mmoles) | Triethyl-aluminum (mmoles) | Polymerization time (min.) | Polymer yield (g.) | Microstructure (percent) | | | Appearance of polymer |
|---|---|---|---|---|---|---|---|---|---|
| | | | | | | cis-1,4 | trans-1,4 | Vinyl | |
| 1 | 2.0 | 1.0 | 1.0 | 70 | 9.8 | 90.3 | 5.7 | 4.0 | Transparent rubbery solid. |
| 2 | 4.0 | 1.0 | 1.0 | 70 | 12.2 | 91.2 | 5.1 | 3.7 | Do. |
| 3 | 2.0 | 1.0 | 0.5 | 70 | 8.8 | 89.4 | 6.7 | 3.9 | Do. |

*Example 3*

Similar experiment to that of Example 2 was effected by using 40 ml. of purified toluene instead of solvent benzene, and 11.5 g. of transparent rubbery solid polymer was obtained. The microstructure of this polymer was 89.3% of cis-1,4, 6.8% of trans-1,4, and 3.9% of vinyl-configurations.

*Example 4*

Butyllithium or diethylcadmium was used as another example of the C component of the catalyst system of this invention, titanium tetrabromide or vanadium oxychloride was used as another example of the B component. Butadiene was polymerized with the catalyst system prepared by combining these compounds with oxidized nickel-diatomaceous earth (Ni content 10%) at −50° C. in the same manner as Example 2.

| No. | Oxidized nickel-diatomaceous earth (g.) | C component (mmoles) | B component (mmoles) | Polymerization time (hr.) | Solvent (ml.) | Polymer yield (g.) | Microstructure (percent) | | |
|---|---|---|---|---|---|---|---|---|---|
| | | | | | | | cis-1,3 | trans-1,4 | vinyl |
| 1 | 2.0 | Butyllithium, 1.0 | Titanium tetrachloride, 1.0 | 5.0 | Benzene, 40 | 1.5 | 91.6 | 5.9 | 2.5 |
| 2 | 2.0 | Diethylcadmium, 1.0 | do | 5.0 | do | 0.8 | 88.4 | 7.2 | 4.4 |
| 3 | 2.0 | Triethylaluminum, 1.0 | Titanium tetrabromide, 1.0 | 1.2 | do | 11.2 | 89.3 | 7.0 | 3.7 |
| 4 | 2.0 | do | Vanadium oxychloride, 1.0 | 18.5 | Toluene, 40 | 0.8 | 88.8 | 7.9 | 3.3 | r.p.m. for stirring in a thermostat at 40° C. for 70 minutes, and then a small quantity of methanol was poured in the bottle to stop the polymerization. Since the polymer thus obtained had entirely dissolved in benzene, the solution was suitably diluted and the solid components of catalyst were eliminated by centrifuge and after some antioxidant was added, the solution was poured into methanol. After drying the precipitate in vacuo at room temperature, 7.5 g. of transparent rubbery solid was obtained. The microstructure was analyzed according to the Morero method and the intrinsic viscosity was measured as a toluene solution at 25° C. The results were as follows:

Analysis of microstructure:
    Cis-1,4, percent _____ 97.3
    Trans-1,4, percent _____ 1.6
    Vinyl, percent _____ 1.1
Intrinsic viscosity:
    $(\eta)_{toluene}^{25°\ C.}$ _____ 4.35

*Example 7*

2.0 mmoles of triethylaluminum, 2.0 mmoles of boron trifluoride etherate and 2 g. of the same oxidized nickel-diatomaceous earth as in Example 6 were put in 40 ml. of benzene at room temperature in the above described order to prepare the catalyst. Then 25 ml. of liquefied butadiene was poured in and the same polymerization test as Example 6 was carried out at 40° C. for 2 hours. The results were as follows:

Yield of purified polymer _____ g__ 2.2
Analysis of microstructure:
    Cis-1,4 _____ percent__ 97.8
    Trans-1,4 _____ do____ 1.8
    Vinyl _____ do____ 0.4

*Example 8*

Oxidized cobalt-diatomaceous earth was prepared from cobalt nitrate by the same procedure as that of oxidized nickel-diatomaceous earth. This substance was black powders containing about 50% of cobalt. 1 g. of the oxidized cobalt-diatomaceous earth was dispersed in 40 ml. of benzene and 2.0 mmoles of boron trifluoride etherate was added thereto. The mixture was heated at 40° C. for 1 hour, cooled to room temperature, added with 2.0 mmoles of triethylaluminum to prepare the catalyst system. 25 ml. of liquefied butadiene was poured therein and polymerized at 40° C. for 15 hours. After purified and dried, 3.5 g. of rubbery polymer was obtained. Microstructure: 91.5% of cis-1,4, 4.5% of trans-1,4 and 4.0% of vinyl-configurations.

*Example 9*

The process of Example 6 was repeated, but the triethylaluminum was replaced by 2.0 mmoles of butyl-lithium. The results were as follows:

Yield of purified polymer _____ g__ 7.0
Analysis of microstructure:
    Cis-1,4 _____ percent__ 94.6
    Trans-1,4 _____ do____ 2.0
    Vinyl _____ do____ 3.4

What we claim is:

1. A process for manufacturing cis-1,4 polybutadiene, which comprises polymerizing butadiene in hydrocarbon solvent at a temperature in the range from −50° C. to 150° C. in an inert atmosphere to a solid polymer having at least 85% cis-1,4 structure, and substantially no gel by using as catalyst a three-component reaction product prepared by effecting reaction through mixing a carrier-supported metal oxide selected from the group consisting of nickel oxides and cobalt oxides, which is suspended in an anhydrous hydrocarbon with a boron trifluoride etherate at a temperature in the range from 10° C. to 100° C. and then with a trialkyl aluminum at a temperature in the range from −80° C. to 30° C., the carrier-supported metal oxide being prepared by the oxidation of the corresponding salt adhered to the carrier at a temperature lower than 600° C., the three components being mixed to react in such mole ratios so that the ratio of Al to B is in the range from 1/10 to 5/1 and that the ratio of said metal oxide to Al is in the range from 1/10 to 10/1.

2. A process according to claim 1, wherein said carrier is diatomaceous earth.

3. A process according to claim 1, wherein said hydrocarbon solvent is selected from the group consisting of benzene, toluene and xylene in anhydrous state.

4. A process according to claim 1, wherein said trialkyl aluminum is triethyl aluminum.

5. A process for manufacturing cis-1,4 polybutadiene, which comprises polymerizing butadiene in hydrocarbon solvent at a temperature in the range from −50° to 150° C. in an inert atmosphere to a solid polymer having at least 85% cis-1,4 structure and substantially no gel by using as catalyst a three-component reaction product prepared by effecting reaction through mixing a diatomaceous earth-supported metal oxide selected from the group consisting of nickel oxides and cobalt oxides, which is suspended in an anhydrous hydrocarbon medium with titanium tetrachloride and a trialkyl aluminum at a temperature in the range from −100° C. to 40° C., the diatomaceous earth-supported metal oxide being prepared by the oxidation of the corresponding salt adhered to diatomaceous earth at a temperature lower than 600° C., the three components being mixed to react in such mole ratios so that the ratio of Al to Ti is in the range from 0.5/1 to 1.2/1 and that the ratio of said metal oxide to Al is in the range from 1/10 to 10/1.

6. A process according to claim 5, wherein said trialkyl aluminum is triethyl aluminum.

References Cited by the Examiner

UNITED STATES PATENTS

| | | | |
|---|---|---|---|
| 2,477,290 | 7/49 | Dornte et al. | 260—683.15 |
| 2,606,940 | 8/52 | Bailey et al. | 260—94.9 |
| 2,882,264 | 4/59 | Barnes | 260—94.9 |
| 2,953,554 | 9/60 | Miller et al. | 260—94.3 |
| 2,965,626 | 12/60 | Pilar | 260—94.3 |
| 2,965,627 | 12/60 | Field et al. | 260—94.3 |
| 2,970,134 | 1/61 | Anderson | 260—94.3 |
| 2,977,349 | 3/61 | Brockway | 260—94.3 |

FOREIGN PATENTS 1,215,953  11/59  France.

JOSEPH L. SCHOFER, *Primary Examiner.*

L. H. GASTON, L. GOTTS, M. LIEBMAN, J. R. LIBERMAN, WILLIAM H. SHORT, *Examiners.*